(12) United States Patent
Amikura et al.

(10) Patent No.: US 11,326,914 B2
(45) Date of Patent: May 10, 2022

(54) FLOW RATE MEASUREMENT APPARATUS AND METHOD FOR MORE ACCURATELY MEASURING GAS FLOW TO A SUBSTRATE PROCESSING SYSTEM

(71) Applicant: TOKYO ELECTRON LIMITED, Tokyo (JP)

(72) Inventors: Norihiko Amikura, Miyagi (JP); Risako Matsuda, Miyagi (JP); Kazuyuki Miura, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 26 days.

(21) Appl. No.: 16/645,898

(22) PCT Filed: May 27, 2019

(86) PCT No.: PCT/JP2019/020790
§ 371 (c)(1),
(2) Date: Mar. 10, 2020

(87) PCT Pub. No.: WO2019/235273
PCT Pub. Date: Dec. 12, 2019

(65) Prior Publication Data
US 2020/0278225 A1    Sep. 3, 2020

(30) Foreign Application Priority Data
Jun. 8, 2018  (JP) .............................. JP2018-109962

(51) Int. Cl.
*G01F 1/50* (2006.01)

(52) U.S. Cl.
CPC ..................... *G01F 1/50* (2013.01)

(58) Field of Classification Search
None
See application file for complete search history.

(56) References Cited

U.S. PATENT DOCUMENTS

2017/0370763 A1*  12/2017  Brashear .................. G01F 1/86

FOREIGN PATENT DOCUMENTS

| JP | 2004-003957 A | 1/2004 |
| JP | 2006-337346 A | 12/2006 |
| JP | 2012-032983 A | 2/2012 |
| JP | 2003-168648 A | 6/2013 |

OTHER PUBLICATIONS

International Search Report issued in Application No. PCT/JP2019/020790 dated Aug. 27, 2019 with English Translation (3 page).

* cited by examiner

*Primary Examiner* — Harshad R Patel
(74) *Attorney, Agent, or Firm* — Weihrouch IP

(57) ABSTRACT

The flow rate measurement method includes: measuring a first pressure of a gas filled in a first flow path connected to a flow rate controller and a second flow path connected to the first flow path; supplying a gas to the first and second flow paths via the flow rate controller and measuring a second pressure and a temperature of the gas filled in the first and second flow paths; after the gas is exhausted from the second flow path, measuring a third pressure of the gas filled in the second flow path; measuring a fourth pressure of the gas filled in the first and second flow paths; and calculating an amount of the gas supplied to the first and second flow paths via the flow rate controller, based on the first, second, third, and fourth pressures and the temperature.

17 Claims, 4 Drawing Sheets

FLOW RATE MEASUREMENT APPARATUS AND METHOD FOR MORE ACCURATELY MEASURING GAS FLOW TO A SUBSTRATE PROCESSING SYSTEM

CROSS REFERENCE TO RELATED APPLICATIONS

This application is a national phase of PCT application No. PCT/JP2019/020790, filed on 27 May 2019, which claims priority from Japanese Patent Application No. 2018-109962, filed on 8 Jun. 2018, all of which are incorporated herein by reference, and priority is claimed to each of the foregoing.

TECHNICAL FIELD

The present disclosure relates to a flow rate measurement method and a flow rate measurement apparatus.

BACKGROUND

There is known a substrate processing in which a substrate disposed in an internal space of a chamber is processed by a gas supplied to the internal space. In the substrate processing, since the flow rate of the gas affects the substrate, the flow rate of the gas is controlled with a high accuracy using a flow rate controller. As a method of measuring the flow rate of the gas, a build-up method is known (see Patent Document 1).

PRIOR ART DOCUMENT

Patent Document

Patent Document 1: Japanese Patent Laid-Open Publication No. 2012-032983

SUMMARY OF THE INVENTION

Problem to be Solved

The present disclosure provides a flow rate measurement method and a flow rate measurement apparatus for measuring a flow rate of a gas with a high accuracy.

Means to Solve the Problem

According to an aspect of the present disclosure, a flow rate measurement method includes: measuring a first pressure of a gas filled in a first flow path connected to a flow rate controller and a second flow path connected to the first flow path; after the first pressure is measured, supplying a gas to the first and second flow paths via the flow rate controller and measuring a second pressure and a temperature of the gas filled in the first and second flow paths; after the gas is exhausted from the second flow path in a state where the first and second flow paths are not connected to each other, measuring a third pressure of the gas filled in the second flow path; after the third pressure is measured, measuring a fourth pressure of the gas filled in the first and second flow paths in a state where the first and second flow paths are connected to each other; and calculating an amount of the gas supplied to the first and second flow paths via the flow rate controller, based on the first, second, third, and fourth pressures and the temperature.

Effect of the Invention

According to the present disclosure, it is possible to measure a flow rate of a gas with a high accuracy.

DETAILED DESCRIPTION TO EXECUTE THE INVENTION

Hereinafter, embodiments of a flow rate measurement method and a flow rate measurement apparatus according to the present disclosure will be described in detail with reference to the drawings.

[Configuration of Substrate Processing System 10]

Figure 1:
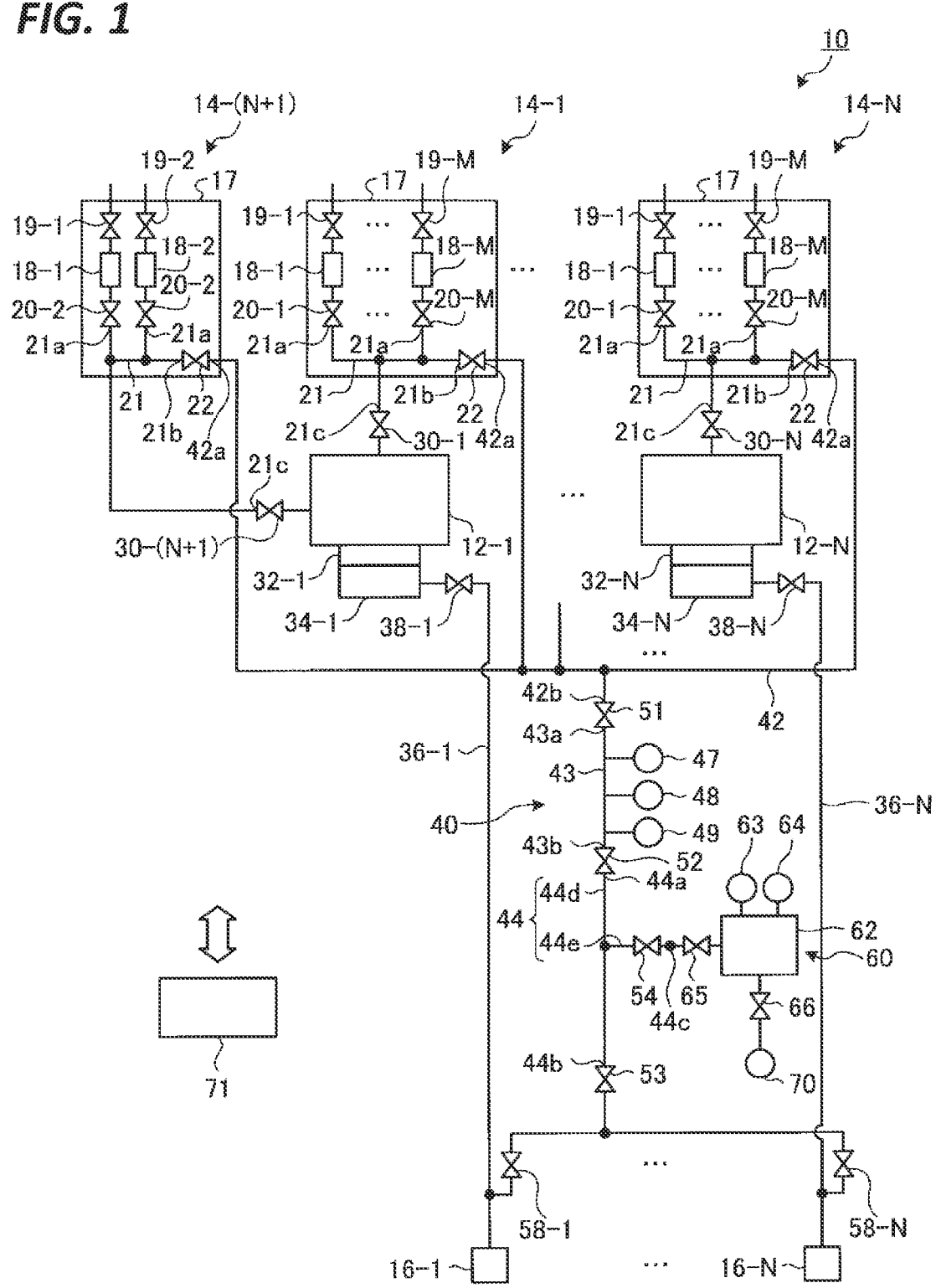
FIG. 1 is a schematic view illustrating an example of a substrate processing system.

FIG. 1 is a schematic view illustrating an example of a substrate processing system 10. The substrate processing system 10 includes a plurality of process modules, and as illustrated in FIG. 1, the substrate processing system 10 includes a plurality of chambers 12-1 to 12-N (the number N is an integer of 2 or more) and a plurality of gas supplies 14-1 to 14-(N+1). A processing space is formed inside the chamber 12-1 which is one of the plurality of chambers 12-1 to 12-N, to accommodate a substrate therein. Among the plurality of chambers 12-1 to 12-N, each chamber 12-$i$ ($i=2$, 3, 4, . . . , N) other than the chamber 12-1 also has a processing space therein, like the chamber 12-1.

Among the plurality of gas supplies 14-1 to 14-(N+1), the plurality of gas supplies 14-1 to 14-N correspond to the plurality of chambers 12-1 to 12-N. Among the plurality of gas supplies 14-1 to 14-N, the gas supply 14-1 that corresponds to the chamber 12-1 includes a housing 17, a plurality of flow rate controllers 18-1 to 18-M (the number M is an integer of 2 or more), a plurality of primary valves 19-1 to 19-M, a plurality of secondary valves 20-1 to 20-M, a first gas flow path 21, and a valve 22. The plurality of flow rate controllers 18-1 to 18-M, the plurality of primary valves 19-1 to 19-M, the plurality of secondary valves 20-1 to 20-M, and the valve 22 are disposed inside the housing 17.

The plurality of flow rate controllers 18-1 to 18-M correspond to a plurality of gas sources (not illustrated) that supply a plurality of different gases, respectively. The flow rate controller 18-1 which is one of the plurality of flow rate controllers 18-1 to 18-M is a so-called mass flow controller, and is connected to a gas source that corresponds to the flow rate controller 18-1 among the plurality of gas sources. The plurality of primary valves 19-1 to 19-M correspond to the plurality of flow rate controllers 18-1 to 18-M. Among the plurality of primary valves 19-1 to 19-M, the primary valve 19-1 that corresponds to the flow rate controller 18-1 is connected to the primary side of the flow rate controller 18-1 and provided in the middle of the flow path that connects the flow rate controller 18-1 and the gas source to each other.

The plurality of secondary valves 20-1 to 20-M correspond to the plurality of flow rate controllers 18-1 to 18-M. Among the plurality of secondary valves 20-1 to 20-M, the secondary valve 20-1 that corresponds to the flow rate controller 18-1 is connected to the flow rate controller 18-1 such that the flow rate controller 18-1 is provided between the primary valve 19-1 and the secondary valve 20-1. Among the plurality of flow rate controllers 18-1 to 18-M, each flow rate controller 18-$j$ (j=2, 3, 4, . . . , M) other than the flow rate controller 18-1 is also provided between a primary valve 19-$j$ and a secondary valve 20-$j$, like the flow rate controller 18-1.

The first gas flow path 21 is provided with a plurality of first ends 21$a$, a second end 21$b$, and a third end 21$c$. The plurality of first ends 21$a$ are connected to the plurality of secondary valves 20-1 to 20-M, respectively. The second end 21$b$ is connected to the valve 22. The portion of the first gas flow path 21 that connects the plurality of secondary valves 20-1 to 20-M and the valve 22 to each other is disposed inside the housing 17.

The substrate processing system 10 further includes a plurality of valves 30-1 to 30-(N+1). Among the plurality of valves 30-1 to 30-(N+1), the plurality of valves 30-1 to 30-N correspond to the plurality of chambers 12-1 to 12-N. Among the plurality of valves 30-1 to 30-N, one end of the valve 30-1 that corresponds to the chamber 12-1 is connected to the third end 21$c$ of the first gas flow path 21 of the gas supply 14-1. The other end of the valve 30-1 is connected to the chamber 12-1 such that the valve 30-1 is provided between the first gas flow path 21 and the chamber 12-1.

Among the plurality of gas supplies 14-1 to 14-N, each gas supply 14-$i$ other than the gas supply 14-1 also has the same configuration as that of the gas supply 14-1. That is, the gas supply 14-$i$ includes the housing 17, the plurality of flow rate controllers 18-1 to 18-M, the plurality of primary valves 19-1 to 19-M, the plurality of secondary valves 20-1 to 20-M, the first gas flow path 21, and the valve 22. Among the plurality of valves 30-1 to 30-N, a valve 30-$i$ that corresponds to the chamber 12-$i$ is provided between the first gas flow path 21 and the chamber 12-$i$, one end of the valve 30-$i$ is connected to the third end 21$c$, and the other end of the valve 30-$i$ is connected to the chamber 12-$i$.

Among the plurality of gas supplies 14-1 to 14-(N+1), the gas supply 14-(N+1) includes two flow rate controllers 18-1 and 18-2, two primary valves 19-1 and 19-2, two secondary valves 20-1 and 20-2, the first gas flow path 21, and the valve 22. The two flow rate controllers 18-1 and 18-2 are connected to two liquid sources (not illustrated), respectively, that supply two different liquids via the two primary valves 19-1 and 19-2, respectively. Among the plurality of valves 30-1 to 30-N, one end of the valve 30-(N+1) is connected to the third end 21$c$ of the first gas flow path 21 of the gas supply 14-(N+1). The other end of the valve 30-(N+1) is connected to the chamber 12-1. The flow rate controller 18-1 of the gas supply 14-(N+1) is a so-called mass flow controller, and has a function of vaporizing a liquid.

The substrate processing system 10 further includes a plurality of pressure control valves 32-1 to 32-N, a plurality of turbo molecular pumps 34-1 to 34-N, a plurality of exhaust devices 16-1 to 16-N, a plurality of exhaust flow paths 36-1 to 36-N, and a plurality of valves 38-1 to 38-N. The plurality of pressure control valves 32-1 to 32-N correspond to the plurality of chambers 12-1 to 12-N. Among the plurality of pressure control valves 32-1 to 32-N, the pressure control valve 32-1 that corresponds to the chamber 12-1 is a so-called automatic pressure control valve, and is configured to adjust the pressure in the internal space of the chamber 12-1. Among the plurality of pressure control valves 32-1 to 32-N, each pressure control valve 32-$i$ other than the pressure control valve 32-1 is also configured to adjust the pressure in the internal space of the chamber 12-$i$, like the pressure control valve 32-1.

The plurality of turbo molecular pumps 34-1 to 34-N correspond to the plurality of chambers 12-1 to 12-N. Among the plurality of turbo molecular pumps 34-1 to 34-N, the turbo molecular pump 34-1 that corresponds to the chamber 12-1 is connected to the processing space of the chamber 12-1 via the pressure control valve 32-1. Among the plurality of turbo molecular pumps 34-1 to 34-N, each turbo molecular pump 34-$i$ other than the turbo molecular pump 34-1 is also connected to the processing space of the chamber 12-$i$ via the pressure control valve 32-$i$, like the turbo molecular pump 34-1.

The plurality of exhaust devices 16-1 to 16-N correspond to the plurality of chambers 12-1 to 12-N. The plurality of exhaust flow paths 36-1 to 36-N correspond to the plurality of chambers 12-1 to 12-N. Among the plurality of exhaust devices 16-1 to 16-N, the exhaust device 16-1 that corresponds to the chamber 12-1 is connected to the turbo molecular pump 34-1 via the exhaust flow path 36-1 that corresponds to the chamber 12-1 among the plurality of exhaust flow paths 36-1 to 36-N. The exhaust device 16-1 is a so-called dry pump. The plurality of valves 38-1 to 38-N correspond to the plurality of chambers 12-1 to 12-N. Among the plurality of valves 38-1 to 38-N, the valve 38-1 that corresponds to the chamber 12-1 is provided in the middle of the exhaust flow path 36-1.

Among the plurality of exhaust devices 16-1 to 16-N, each exhaust device 16-$i$ other than the exhaust device 16-1 is also connected to the turbo molecular pump 34-$i$ via an exhaust flow path 36-$i$, like the exhaust device 16-1. Among the plurality of valves 38-1 to 38-N, each valve 38-$i$ other than the valve 38-1 is also provided in the middle of the exhaust flow path 36-$i$, like the valve 38-1.

The substrate processing system 10 further includes a flow rate measurement system 40. The flow rate measurement system 40 includes a second gas flow path 42, a first valve 51, a third gas flow path 43, a second valve 52, pressure sensors 47 and 48, and a temperature sensor 49. The second gas flow path 42 is provided with a plurality of fourth ends 42$a$ and a fifth end 42$b$. The plurality of fourth ends 42$a$ are connected to the valves 22 of the plurality of gas supplies 14-1 to 14-(N+1), respectively. The fifth end 42$b$ is connected to the first valve 51.

The third gas flow path 43 is provided with a sixth end 43$a$ and a seventh end 43$b$. The sixth end 43$a$ is connected to the first valve 51 such that the first valve 51 is provided between the second gas flow path 42 and the third gas flow path 43. The seventh end 43$b$ is connected to the second valve 52. The pressure sensors 47 and 48 are arranged at two different positions in the middle of the third gas flow path 43. Each of the pressure sensors 47 and 48 is configured to measure the pressure of the gas filled in the third gas flow path 43. The temperature sensor 49 is configured to measure the temperature of the gas filled in the third gas flow path 43.

The flow rate measurement system 40 further includes a fourth gas flow path 44, a third valve 53, and a fourth valve 54. The fourth gas flow path 44 includes a first partial flow path 44$d$ and a second partial flow path 44$e$. The first partial flow path 44$d$ is provided with an eighth end 44$a$ and a ninth end 44$b$. The second partial flow path 44$e$ branches from the first partial flow path 44$d$, and is provided with a tenth end 44$c$. The fourth valve 54 is provided in the middle of the second partial flow path 44$e$.

The eighth end 44$a$ is connected to the second valve 52 such that the second valve 52 is provided between the third gas flow path 43 and the fourth gas flow path 44. The ninth end 44b is connected to the third valve 53. At this time, the exhaust flow path 36-1 branches between the valve 38-1 and the exhaust device 16-1, and is connected to the third valve 53 such that the third valve 53 is provided between the fourth gas flow path 44 and the exhaust flow path 36-1. Among the plurality of exhaust flow paths 36-1 to 36-N, each exhaust flow path 36-i other than the exhaust flow path 36-1 is also connected to the third valve 53 such that the third valve 53 is provided between the fourth gas flow path 44 and the exhaust flow path 36-i.

The flow rate measurement system 40 further includes a plurality of valves 58-1 to 58-N. The plurality of valves 58-1 to 58-N correspond to the plurality of chambers 12-1 to 12-N. Among the plurality of valves 58-1 to 58-N, the valve 58-1 that corresponds to the chamber 12-1 is provided between the third valve 53 and the exhaust flow path 36-1. Among the plurality of valves 58-1 to 58-N, each valve 58-i other than the valve 58-1 is provided between the third valve 53 and the exhaust flow path 36-i, like the valve 58-1.

The flow rate measurement system 40 further includes a reference device 60 and a reference pressure sensor 70. The reference device 60 includes a tank 62, a pressure sensor 63, a temperature sensor 64, and valves 65 and 66. The tank 62 has an internal space therein. The pressure sensor 63 is configured to measure the pressure of the gas filled in the internal space of the tank 62. The temperature sensor 64 is configured to measure the temperature of the gas filled in the internal space of the tank 62. The valve 65 is provided between the second partial flow path 44e of the fourth gas flow path 44 and the tank 62. The valve 66 is connected to the tank 62.

The reference pressure sensor 70 is connected to the internal space of the tank 62 via the valve 66. The reference pressure sensor 70 is configured to measure the pressure of the gas filled in the internal space of the tank 62, when the reference pressure sensor 70 is connected to the internal space of the tank 62.

The substrate processing system 10 further includes a main controller 71. The main controller 71 is a computer device, and includes a processor, a storage device, an input device, and a display device. The processor is formed by, for example, a CPU, performs information processing and controls the storage device, the input device, and the display device by executing computer programs installed in the main controller 71. Further, the processor controls each unit of the substrate processing system 10 and each unit of the flow rate measurement system 40 by executing computer programs. The storage device records computer programs, and records information used by the processor. The input device is formed by, for example, a keyboard, and outputs information generated by a user's operation to the processor. The display device outputs the information generated by the processor such that the user may recognize the information.

Figure 2:
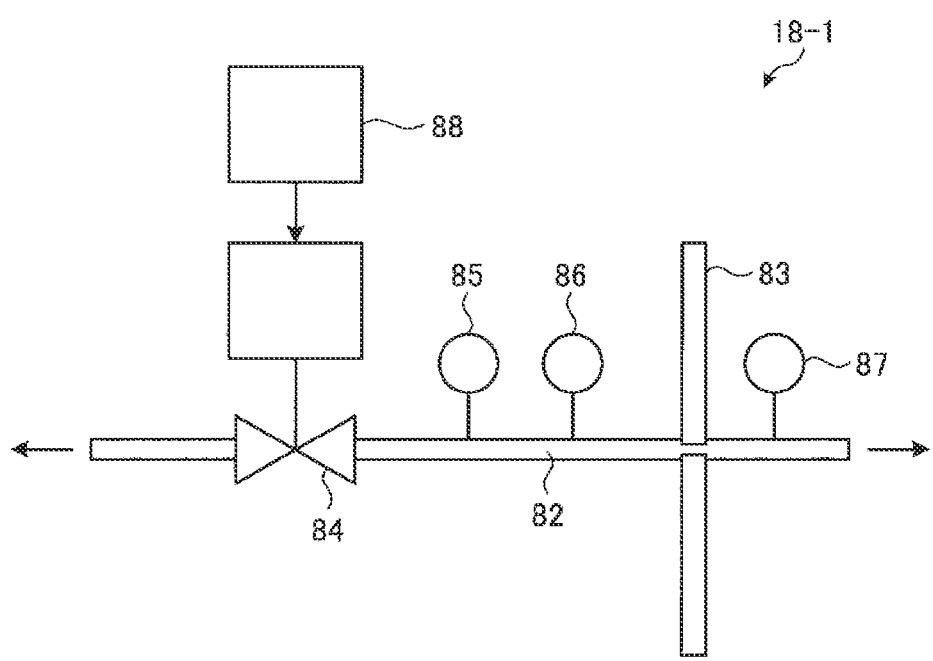
FIG. 2 is a view illustrating an example of a flow rate controller.

FIG. 2 is a view illustrating an example of the flow rate controller 18-1. The flow rate controller 18-1 is a mass flow controller or a pressure control type flow controller, and includes a flow path 82, an orifice member 83, a control valve 84, a pressure sensor 85, a temperature sensor 86, a pressure sensor 87, and a controller 88. The flow path 82 is provided between the primary valve 19-1 and the secondary valve 20-1, one end of the flow path 82 is connected to the primary valve 19-1, and the other end of the flow path 82 is connected to the secondary valve 20-1. The orifice member 83 is provided in the middle of the flow path 82, and partially reduces the cross-sectional area of the flow path 82. The control valve 84 is provided between the primary valve 19-1 and the orifice member 83 in the middle of the flow path 82. The pressure sensor 85 is provided between the control valve 84 and the orifice member 83 in the middle of the flow path 82. The pressure sensor 85 is configured to measure the pressure of the gas filled between the control valve 84 and the orifice member 83 in the middle of the flow path 82. The temperature sensor 86 is configured to measure the temperature of the gas filled between the control valve 84 and the orifice member 83 in the middle of the flow path 82. The pressure sensor 87 is configured to measure the pressure of the gas filled between the orifice member 83 and the secondary valve 20-1 in the middle of the flow path 82.

The controller 88 controls the pressure sensor 85 to measure the pressure of the gas filled in the portion of the flow path 82 close to the primary valve 19-1 from the orifice member 83. The controller 88 controls the pressure sensor 87 to measure the pressure of the gas filled in the portion of the flow path 82 close to the secondary valve 20-1 from the orifice member 83. When the pressure on the side of the primary valve 19-1 from the orifice member 83 is twice or more the pressure on the side of the secondary valve 20-1 from the orifice member 83, the controller 88 calculates the flow rate based on the pressure measured by the pressure sensor 85. When the pressure on the side of the primary valve 19-1 from the orifice member 83 is smaller than twice the pressure on the side of the secondary valve 20-1 from the orifice member 83, the controller 88 calculates the flow rate based on the pressure measured by the pressure sensor 85 and the pressure measured by the pressure sensor 87. The controller 88 controls an opening degree of the control valve 84 to reduce a difference between the calculated flow rate and a set flow rate. In addition, when the flow rate controller 18-1 is used in a state where the pressure on the primary side (upstream side) of the flow path 82 from the orifice member 83 is twice or more the pressure on the downstream side (secondary side) of the flow path 82 from the orifice member 83, the flow rate controller 18-1 may not include the pressure sensor 87.

[Flow Rate Measurement Method]

Figure 3:
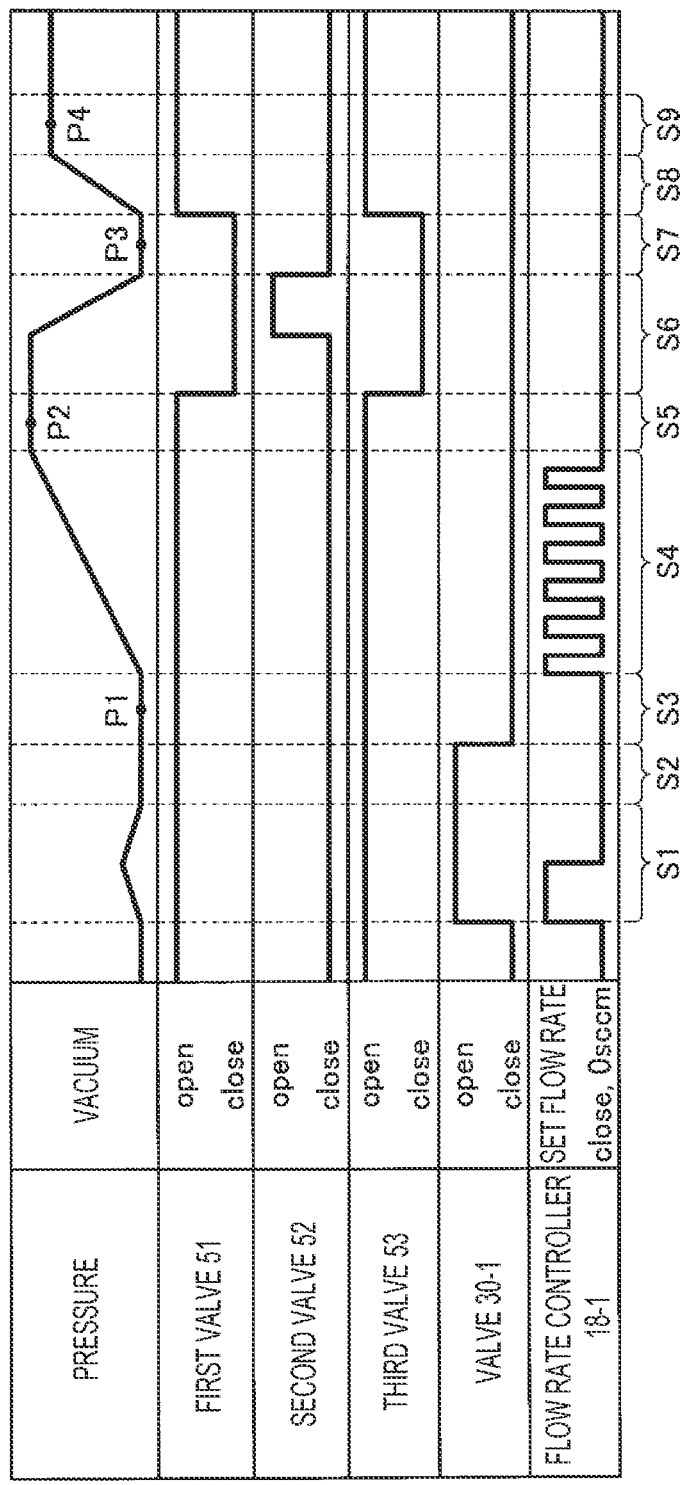
FIG. 3 is a sequence chart illustrating an example of a flow rate measurement method.

FIG. 3 is a sequence chart illustrating an example of the flow rate measurement method. In the sequence chart of FIG. 3, the horizontal axis represents a time. The vertical axis represents the pressure of the third gas flow path 43, the open/closed state of the first valve 51, the open/closed state of the second valve 52, and the open/closed state of the third valve 53. The vertical axis further represents the open/closed state of the valve 30-1 and the gas output state of the flow rate controller 18-1.

In the flow rate measurement method, initially, the first valve 51 and the third valve 53 are opened, and the second valve 52, the valve 30-1, and the fourth valve 54 are closed. First, the main controller 71 opens the valve 30-1 so as to connect the first gas flow path 21 and the processing space of the chamber 12-1 to each other. Further, the main controller 71 controls the gas supply 14-1 so as to supply a gas from one of the plurality of gas sources that corresponds to the flow rate controller 18-1, to the first gas flow path 21 (step S1). The gas that has stayed inside the flow rate controller 18-1 is replaced with the gas supplied from the gas source to the first gas flow path 21. After the gas that has stayed inside the flow rate controller 18-1 is sufficiently purged, the main controller 71 controls the gas supply 14-1 so as to stop the supply of the gas from the gas source to the first gas flow path 21.

After the supply of the gas from the gas source to the first gas flow path 21 is stopped, the main controller 71 controls the turbo molecular pump 34-1 so as to exhaust the gas filled in the processing space of the chamber 12-1 (step S2). When the processing space of the chamber 12-1 is exhausted, the first gas flow path 21, the second gas flow path 42, and the third gas flow path 43 are evacuated to a predetermined degree of vacuum. After the first gas flow path 21, the second gas flow path 42, and the third gas flow path 43 are evacuated to the predetermined degree of vacuum, the main controller 71 closes the valve 30-1 so as to block the first gas flow path 21 from the processing space of the chamber 12-1. After the first gas flow path 21 is blocked from the processing space of the chamber 12-1, the main controller 71 controls the pressure sensor 47 so as to measure a pressure P1 inside the first gas flow path 21, the second gas flow path 42, and the third gas flow path 43 (step S3).

After the pressure P1 is measured, the main controller 71 controls the gas supply 14-1 so as to supply the gas from the gas source to the first gas flow path 21 (step S4). The gas is supplied to the first gas flow path 21 in the manner that a predetermined process is repeated a predetermined number of times, that is, a plurality of gas pulses are generated. Each of the plurality of gas pulses is formed by supplying the gas to the first gas flow path 21 via the flow rate controller 18-1, and stopping the supply of the gas after a predetermined time elapses from the timing when the supply of the gas is started. The main controller 71 controls the temperature sensor 86 of the flow rate controller 18-1 so as to measure a temperature Tsray of the gas filled in the flow path 82.

The gas supplied to the first gas flow path 21 via the flow rate controller 18-1 is uniformly diffused to the first gas flow path 21, the second gas flow path 42, and the third gas flow path 43 as a time elapses. As the gas is sufficiently diffused, the pressure of the gas filled in the first gas flow path 21, the second gas flow path 42, and the third gas flow path 43 is stabilized. After the gas supplied to the first gas flow path 21 via the flow rate controller 18-1 is sufficiently diffused, the main controller 71 controls the pressure sensor 47 so as to measure a pressure P2 inside the first gas flow path 21, the second gas flow path 42, and the third gas flow path 43. Further, the main controller 71 controls the temperature sensor 49 so as to measure a temperature Tfv inside the third gas flow path 43 (step S5).

After the pressure P2 is measured, the main controller 71 closes the first valve 51 so as to block the third gas flow path 43 from the first gas flow path 21 and the second gas flow path 42 (step S6). Further, after the pressure P2 is measured, the main controller 71 closes the third valve 53 so as to block the third gas flow path 43 from the plurality of exhaust devices 16-1 to 16-N.

After the first valve 51 and the third valve 53 are closed, the main controller 71 opens the second valve 52 so as to connect the third gas flow path 43 to the fourth gas flow path 44. When the third gas flow path 43 is connected to the fourth gas flow path 44, a portion of the gas filled in the third gas flow path 43 is exhausted to the portion of the fourth gas flow path 44 that is surrounded by the second valve 52, the third valve 53, and the fourth valve 54. After the portion of the gas filled in the third gas flow path 43 is exhausted to the fourth gas flow path 44, the main controller 71 closes the second valve 52 so as to block the third gas flow path 43 from the fourth gas flow path 44.

The gas remaining in the third gas flow path 43 is uniformly diffused to the third gas flow path 43 as a predetermined time elapses, and the pressure of the gas filled in the third gas flow path 43 is stabilized. After the gas remaining in the third gas flow path 43 is sufficiently diffused, the main controller 71 controls the pressure sensor 47 so as to measure a pressure P3 inside the third gas flow path 43 (step S7). After the pressure P3 is measured, the main controller 71 opens the third valve 53 so as to connect the fourth gas flow path 44 to the plurality of exhaust devices 16-1 to 16-N. When the third valve 53 is opened, the gas staying in the portion of the fourth gas flow path 44 that is surrounded by the second valve 52, the third valve 53, and the fourth valve 54 is exhausted to the plurality of exhaust devices 16-1 to 16-N.

Further, after the pressure P3 is measured, the main controller 71 opens the first valve 51 so as to connect the third gas flow path 43 to the first gas flow path 21 and the second gas flow path 42. When the first valve 51 is opened, a portion of the gas staying in the first gas flow path 21 and the second gas flow path 42 moves to the third gas flow path 43, and is diffused to the first gas flow path 21, the second gas flow path 42, and the third gas flow path 43. As the gas is sufficiently diffused, the pressure of the gas filled in the first gas flow path 21, the second gas flow path 42, and the third gas flow path 43 is stabilized. After the gas is sufficiently diffused, the main controller 71 controls the pressure sensor 47 so as to measure a pressure P4 inside the first gas flow path 21, the second gas flow path 42, and the third gas flow path 43 (step S9).

A flow rate Q of the gas supplied per unit time to the first gas flow path 21 via the flow rate controller 18-1 in step S4 is expressed by Equation (1) below using a gas constant R.

$$Q = dP/dt \times 1/R \times (Vstray/Tstray + Vext/Text + Vfv/Tfv) \quad (1)$$

Here, the dP is expressed by the following equation using the pressures P1 and P2.

$$dP = P2 - P1$$

The dt represents a time Δt during which the gas is supplied to the first gas flow path 21 via the flow rate controller 18-1 in step S4. The volume Vstray represents the volume between the orifice member 83 of the flow path 82 of the flow rate controller 18-1 and the diaphragm of the secondary valve 20-1. The temperature Tsray represents the temperature of the gas that flows through the flow path 82 of the flow rate controller 18-1, and represents the temperature measured by the temperature sensor 86 of the flow rate controller 18-1. The volume Vext represents the sum of the volume of the first gas flow path 21 and the volume of the second gas flow path 42. The temperature Text represents the temperature of the gas filled in the first gas flow path 21 and the second gas flow path 42 when the pressure P2 is measured. The volume Vfv represents the volume of the third gas flow path 43. The temperature Tfv represents the temperature of the gas filled in the third gas flow path 43 when the pressure P2 is measured.

Further, Equation (2) below is satisfied from the Boyle-Charles' law.

$$P2 \times Vext/Text + P3 \times Vfv/Tfv = P4 \times Vext/Text + P4 \times Vfv/Tfv \quad (2)$$

By transforming Equation (2), Equation (3) below is derived.

$$Vext/Text = Vfv/Tfv \times (P4 - P3)/(P2 - P4) \quad (3)$$

By substituting Equation (3) in Equation (1), Equation (4) below is derived.

$$Q = (P2 - P1)/\Delta t \times 1/R \times \{Vstray/Tstray + Vfv/Tfv \times (P2 - P3)/(P2 - P4)\} \quad (4)$$

Thus, the number of moles "n" of the gas supplied to the first gas flow path 21 via the flow rate controller 18-1 in step S4 is expressed by Equation (5) below.

$$n=(P2-P1)/R\times\{V\text{stray}/T\text{stray}+Vfv/Tfv\times(P2-P3)/(P2-P4)\}\quad(5)$$

At this time, the value obtained by dividing the number of moles "n" by the number of the plurality of gas pulses generated in step S4 represents an amount of the gas supplied per gas pulse to the first gas flow path 21 via the flow rate controller 18-1.

Figure 4:
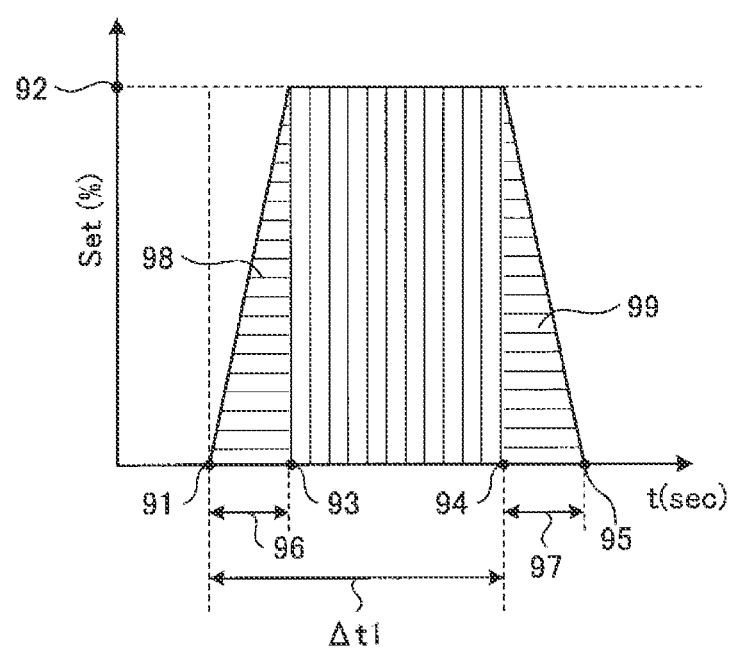
FIG. 4 is a graph representing an example of a change in flow rate of a gas supplied to a first gas flow path via a flow rate controller by one of a plurality of gas pulses generated in step S4.

FIG. 4 is a graph representing an example of a change in flow rate of the gas supplied to the first gas flow path 21 via the flow rate controller 18-1 by one of the plurality of gas pulses generated in step S4. The flow rate of the gas supplied from the flow rate controller 18-1 to the first gas flow path 21 increases gradually after a timing 91 when the gas supply 14-1 is controlled to supply the gas from the flow rate controller 18-1 to the first gas flow path 21. After a timing 93 when the flow rate reaches a predetermined set flow rate 92, the flow rate does not change and is fixed in a substantially equal state to the predetermined set flow rate 92. The gas supply 14-1 is controlled to stop the supply of the gas from the flow rate controller 18-1 to the first gas flow path 21, at a timing 94 after a predetermined time $\Delta t1$ elapses from the timing 91. The flow rate decreases gradually after the timing 94. After a timing 95 succeeding the timing 94, the flow rate becomes substantially equal to 0, and the supply of the gas from the flow rate controller 18-1 to the first gas flow path 21 is stopped.

When transient response periods 96 and 97 are sufficiently short, the amount of the gas supplied to the first gas flow path 21 by one gas pulse is substantially equal to a value obtained by multiplying the predetermined set flow rate 92 by the predetermined time $\Delta t1$. When the ratio of the lengths of the transient response periods 96 and 97 to the predetermined time $\Delta t1$ is relatively large, the amount of the gas supplied to the first gas flow path 21 by one gas pulse may have a relatively large error from the obtained value.

The flow rate measurement method calculates the number of moles "n" of the gas supplied to the first gas flow path 21 via the flow rate controller 18-1 in step S4, with a high accuracy. Thus, even when the ratio of the transient response periods 96 and 97 to the predetermined time $\Delta t1$ is relatively large, the flow rate measurement method may calculate the number of moles "n" of the gas supplied to the first gas flow path 21 via the flow rate controller 18-1 in step S4 with the high accuracy. Further, since the number of moles "n" is calculated with the high accuracy, the flow rate measurement method may calculate the amount of the gas supplied per gas pulse to the first gas flow path 21 via the flow rate controller 18-1 with the high accuracy.

For each flow rate controller 18-i other than the flow rate controller 18-1 among the plurality of flow rate controllers 18-1 to 18-M, the amount of the gas supplied to the first gas flow path 21 via the flow rate controller 18-i is also calculated in the same manner as that for the flow rate controller 18-1. For each gas supply 14-i other than the gas supply 14-1 among the plurality of gas supplies 14-1 to 14-N, the amount of the gas supplied to the first gas flow path 21 via each of the plurality of flow rate controllers 18-1 to 18-M is also calculated in the same manner as that for the gas supply 14-1.

The length of the transient response period 96 from the timing 91 to the timing 93 and the length of the transient response period 97 from the timing 94 to the timing 95 may differ for each of the plurality of flow rate controllers 18-1 to 18-M. Further, an amount 98 of the gas supplied to the first gas flow path 21 during the transient response period 96 and an amount 99 of the gas supplied to the first gas flow path 21 during the transient response period 97 may also differ for each of the plurality of flow rate controllers 18-1 to 18-M.

The flow rate measurement method calculates the number of moles "n" of the gas supplied to the first gas flow path 21 via the flow rate controller 18-1 in step S4, with the high accuracy. Thus, even when the gas amounts 98 and 99 have the individual difference for each of the plurality of flow rate controllers 18-1 to 18-M, the flow rate measurement method may calculate the amount of the gas supplied per gas pulse to the first gas flow path 21 via the flow rate controller 18-1 with the high accuracy.

The substrate processing system 10 is used for processing a substrate in a state where the valves 22 of the plurality of gas supplies 14-1 to 14-(N+1) are closed, after the flow rate measurement method described above is performed. The substrate processing system 10 may adjust the amount of the gas supplied to the processing space of the chamber 12-1 via the flow rate controller 18-1 with the high accuracy, by adjusting the number of the plurality of gas pulses. Since the amount of the gas supplied to the processing space of the chamber 12-1 via the flow rate controller 18-1 is adjusted with the high accuracy, the substrate processing system 10 may appropriately process a substrate.

While the flow rate measurement method described above uses the pressure measured by the pressure sensor 47, an average of the pressure measured by the pressure sensor 47 and the pressure measured by the pressure sensor 48 may be used. In addition, the flow rate measurement system 40 may have at least one of the pressure sensors 47 and 48. That is, the flow rate measurement system 40 may have one or more pressure sensors for measuring the pressure in the third gas flow rate 43.

In step S4 of the flow rate measurement method, the gas is supplied to the first gas flow path 21 using the plurality of gas pulses. However, the gas may be supplied to the first gas flow path 21 using one gas pulse. Even when the gas is supplied to the first gas flow path 21 using one gas pulse, the flow rate measurement method may calculate the amount of the gas supplied to the first gas flow path 21 with the high accuracy.

The first gas flow path 21, the second gas flow path 42, and the third gas flow path 43 are evacuated using the turbo molecular pump 34-1 that evacuates the chamber 12-1, in step S2 of the flow rate measurement method. However, the evacuation may be performed using other devices. Examples of the devices include an exhaust device separately provided in the flow rate measurement system 40. In this case as well, the flow rate measurement method may calculate the amount of the gas supplied to the first gas flow path 21 via the flow rate controller 18-1 with the high accuracy.

The embodiments disclosed herein should not be constructed as being limited. The embodiments described above may be omitted, replaced or changed in various forms without departing from the scope and the gist of the appended claims.

DESCRIPTION OF SYMBOLS

10: substrate processing system
12-1 to 12-N: a plurality of chambers
14-1 to 14-(N+1): a plurality of gas supplies
18-1 to 18-M: a plurality of flow rate controllers
30-1 to 30-(N+1): a plurality of valves
34-1 to 34-N: a plurality of turbo molecular pumps
40: flow rate measurement system
21: first gas flow path 42: second gas flow path
43: third gas flow path
44: fourth gas flow path
47: pressure sensor
48: pressure sensor
49: temperature sensor
51: first valve
52: second valve
53: third valve
71: main controller

What is claimed is:

1. A method of measuring a flow rate, comprising:
providing a connection, at a processing space where a substrate is processed, to a first flow path which is connected to a flow rate controller at a first end of the first flow path, and a second flow path which is connected to the first flow path at a second end of the first flow path;
measuring a first pressure of a remaining gas filled in the first and second flow paths;
after the first pressure is measured, supplying a processing gas to the first and second flow paths via the flow rate controller, and measuring a second pressure and a temperature of the processing gas filled in the first and second flow paths;
after the second pressure is measured, disconnecting the second flow path from the first flow path, and exhausting the processing gas from the second flow path by a pump in communication with the second flow path;
after the processing gas is exhausted from the second flow path, measuring a third pressure in the second flow path;
after the third pressure is measured, connecting the first and second flow paths and measuring a fourth pressure of the processing gas filled in the first and second flow paths; and
determining a flow rate measurement of the processing gas supplied to the first and second flow paths via the flow rate controller, based on the first, second, third, and fourth pressures and the temperature,
wherein the processing gas is supplied by generating a plurality of gas pulses.

2. The method according to claim 1, wherein the processing gas is supplied to the first and second flow paths in a manner that a process is repeated a plurality of times, the process including:
supplying the processing gas to the first flow path via the flow rate controller; and
stopping the supply of the processing gas to the first flow path via the flow rate controller, after a predetermined time elapses from a timing when the processing gas starts to be supplied to the first flow path via the flow rate controller.

3. The method according to claim 2, further comprising:
before the first pressure is measured, evacuating the first and second flow paths through the processing space in a manner that the remaining gas in the first and second flow paths is exhausted from the processing space; and
after the first and second flow paths are evacuated, disconnecting the processing space from the first flow path to measure the first pressure,
wherein the first, second, third, and fourth pressures are measured when the processing space is not connected to the first flow path.

4. The apparatus according to claim 3, wherein in evacuating of the first and second flow paths:
a substitution gas is supplied to the first flow path, and after the substitution gas is supplied to the first flow path, the first and second flow paths are evacuated in a manner that the substitution gas and the remaining gas are exhausted from the processing space.

5. The method according to claim 1, further comprising:
before the first pressure is measured, evacuating the first and second flow paths through the processing space in a manner that the remaining gas in the first and second flow paths is exhausted from the processing space; and
after the first and second flow paths are evacuated, disconnecting the processing space from the first flow path to measure the first pressure,
wherein the first, second, third, and fourth pressures are measured when the processing space is not connected to the first flow path.

6. The method according to claim 5, wherein in evacuating of the first and second flow paths:
a substitution gas is supplied to the first flow path, and after the substitution gas is supplied to the first flow path, the first and second flow paths are evacuated in a manner that the substitution gas and the remaining gas are exhausted from the processing space.

7. The method according to claim 1, wherein the determining the flow rate measurement of the processing gas supplied to the first and second flow paths via the flow rate controller includes determining the flow rate by Equation (1) below:

$$Q = dP/dt \times 1/R \times (V\text{stray}/T\text{stray} + V\text{ext}/T\text{ext} + V\text{fv}/T\text{fv}) \quad (1),$$

wherein Q represents the flow rate of the processing gas, dP represents a value obtained by subtracting the first pressure from the second pressure, dt represents a time during which the processing gas is supplied, Vstray represents a volume of the first flow path between the flow rate controller and a valve between the flow rate controller and the processing space, Tstray represents a temperature of the residual gas, Vext represents a volume of the first flow path, Text represents a temperature of the processing gas filled in the first flow path when the second pressure is measured, Vfv represents a volume of the second flow path, and Tfv represents the temperature of the processing gas filled in the first and second flow paths when the second pressure is measured.

8. The method according to claim 1, further including:
gradually increasing a flow rate of the processing gas supplied to the first and second flow paths via the flow rate controller at a first timing after the supply of the processing gas is started,
after a second timing when the flow rate reaches a predetermined set flow rate after the first timing, the flow rate is fixed in a substantially equal state to the predetermined set flow rate,
at a third timing a first predetermined time after the first timing, the supply of the processing gas is stopped and the flow rate decreases gradually after the third timing, and
at a fourth timing succeeding the third timing, the flow rate is substantially equal to 0.

9. The method according to claim 8, further including controlling a period between the first and second timings and a period between the third and fourth timings to be shorter than a second predetermined time.

10. The method according to claim 1, wherein an amount of the processing gas supplied to the first and second flow paths via the flow rate controller is adjusted by adjusting a number of the plurality of gas pulses.

11. The method according to claim 1, wherein the second pressure is obtained by calculating an average of a plurality of pressures measured at different positions in the second flow path.

12. An apparatus of measuring a flow rate, comprising:
a connection, at a processing space where a substrate is processed, to a first flow path which is connected to a flow rate controller at a first end of the first flow path, and a second flow path which is connected to the first flow path at a second end of the first flow path;
a first valve provided between the processing space and the first flow path;
a second valve provided between the first and second flow paths;
a pressure sensor configured to measure a pressure of a gas filled in the second flow path;
a temperature sensor configured to measure a temperature of the gas filled in the second flow path; and
a controller configured to:
control the pressure sensor to measure a first pressure of a remaining gas filled in the first and second flow paths,
after the first pressure is measured, control the flow rate controller to supply a processing gas to the first and second flow paths via the flow rate controller,
after the processing gas is supplied to the first and second flow paths, control the pressure sensor to measure a second pressure and a temperature of the processing gas filled in the first and second flow paths,
after the second pressure is measured, control the second valve to disconnect the first and second flow paths from each other, and exhaust the processing gas from the second flow path by a pump in communication with the second flow path,
after the processing gas is exhausted from the second flow path, control the pressure sensor to measure a third pressure in the second flow path,
after the third pressure is measured, control the second valve to connect the first and second flow paths to each other,
after the first and second flow paths are connected to each other, control the pressure sensor to measure a fourth pressure of the processing gas filled in the first and second flow paths, and
determine a flow rate measurement of the processing gas based on the first, second, third, and fourth pressures and the temperature via the flow rate controller,
wherein the processing gas is supplied by generating a plurality of gas pulses.

13. The apparatus according to claim 12, wherein the controller is configured to determine the flow rate measurement of the processing gas supplied to the first and second flow paths via the flow rate controller by Equation (1) below:

$$Q = dP/dt \times 1/R \times (V\text{stray}/T\text{stray} + V\text{ext}/T\text{ext} + V\!f\!v/T\!f\!v) \quad (1),$$

wherein Q represents the flow rate of the processing gas, dP represents a value obtained by subtracting the first pressure from the second pressure, dt represents a time during which the processing gas is supplied, Vstray represents a volume of the first flow path between the flow rate controller and a valve between the flow rate controller and the processing space, Tstray represents a temperature of the residual gas, Vext represents a volume of the first flow path, Text represents a temperature of the processing gas filled in the first flow path when the second pressure is measured, Vfv represents a volume of the second flow path, and Tfv represents the temperature of the processing gas filled in the first and second flow paths when the second pressure is measured.

14. The apparatus according to claim 12, wherein the controller is further configured to:
gradually increase a flow rate of the processing gas supplied to the first and second flow paths via the flow rate controller at a first timing after the supply of the processing gas is started,
after a second timing when the flow rate reaches a predetermined set flow rate after the first timing, the flow rate is fixed in a substantially equal state to the predetermined set flow rate,
at a third timing a first predetermined time after the first timing, the supply of the processing gas is stopped and the flow rate decreases gradually after the third timing, and
at a fourth timing succeeding the third timing, the flow rate is substantially equal to 0.

15. The apparatus according to claim 14, wherein the controller is further configured to control a period between the first and second timings and a period between the third and fourth timings to be shorter than a second predetermined time.

16. The apparatus according to claim 12, wherein the controller is configured to adjust an amount of the processing gas supplied to the first and second flow paths via the flow rate controller by adjusting a number of the plurality of gas pulses.

17. The apparatus according to claim 12, wherein the pressure sensor comprises a plurality of pressure sensors located at different positions in the second flow path, and
the controller is configured to obtain the second pressure by calculating an average of a plurality of pressures measured by the plurality of pressure sensors.

* * * * *